US011518700B2

(12) United States Patent
Ornum et al.

(10) Patent No.: US 11,518,700 B2
(45) Date of Patent: Dec. 6, 2022

(54) FEEDBACK LOOP FOR SLUDGE FILTERING

(71) Applicant: Komline-Sanderson Corporation, Peapack, NJ (US)

(72) Inventors: Jess Ornum, Easton, PA (US); Colin Dray, Hackettstown, NJ (US); Christopher Komline, Gladstone, NJ (US)

(73) Assignee: KOMLINE-SANDERSON CORPORATION, Peapack, NJ (US)

( * ) Notice: Subject to any disclaimer, the term of this patent is extended or adjusted under 35 U.S.C. 154(b) by 400 days.

(21) Appl. No.: 16/597,093

(22) Filed: Oct. 9, 2019

(65) Prior Publication Data

US 2020/0109074 A1    Apr. 9, 2020

Related U.S. Application Data

(60) Provisional application No. 62/742,982, filed on Oct. 9, 2018.

(51) Int. Cl.
    *C02F 11/123*    (2019.01)
    *C02F 11/143*    (2019.01)
    (Continued)

(52) U.S. Cl.
    CPC .......... *C02F 11/123* (2013.01); *C02F 11/143* (2019.01); *C02F 11/147* (2019.01);
    (Continued)

(58) Field of Classification Search
    None
    See application file for complete search history.

(56) References Cited

U.S. PATENT DOCUMENTS

| 7,972,517 B1 * | 7/2011 | Miller | B01D 25/12 |
| | | | 210/710 |
| 8,515,581 B2 * | 8/2013 | Piironen | C02F 1/008 |
| | | | 700/271 |

(Continued)

FOREIGN PATENT DOCUMENTS

JP    2018099658 A    *    6/2018

OTHER PUBLICATIONS

Machine translation of JP-2018099658-A, pp. 1-7. (Year: 2018).*

(Continued)

*Primary Examiner* — Clare M Perrin
(74) *Attorney, Agent, or Firm* — Buckley, Maschoff & Talwalkar LLC

(57) ABSTRACT

Provided is a filtration system and process that enhances mineral removal from sludge through a novel recirculation and mixing apparatus. In one example, the system may include a filter configured to remove minerals from sludge, a pump configured to move the sludge towards the filter, a pre-filtering system configured to add an agent into the sludge prior to the sludge making contact with the filter, a drainage collection system including one ore more reservoirs configured to collect water drained during and/or after the filtering and feedback the drained water to the pump, and valving configured configured to mix the drained water with the sludge to generate a mixture which is moved by the pump towards the filter.

9 Claims, 2 Drawing Sheets

(51) Int. Cl.
*C02F 11/147* (2019.01)
*B01D 21/01* (2006.01)
*B01D 33/04* (2006.01)
*C02F 11/125* (2019.01)

(52) U.S. Cl.
CPC .............. *B01D 21/01* (2013.01); *B01D 33/04* (2013.01); *C02F 11/125* (2013.01)

(56) References Cited

U.S. PATENT DOCUMENTS

| | | | | |
|---|---|---|---|---|
| 2011/0297016 | A1* | 12/2011 | Yamashita | ............ C02F 11/147 100/145 |
| 2017/0210646 | A1* | 7/2017 | Zidon | ........................ C02F 1/56 |
| 2017/0349460 | A1* | 12/2017 | Pembroke | ............. C02F 1/5209 |

OTHER PUBLICATIONS

Penn State, "What is sewage sludge and what can be done with it?", 2010, pp. 1-17, accessed online at https://extension.psu.edu/what-is-sewage-sludge-and-what-can-be-done-with-it (Year: 2010).*

* cited by examiner

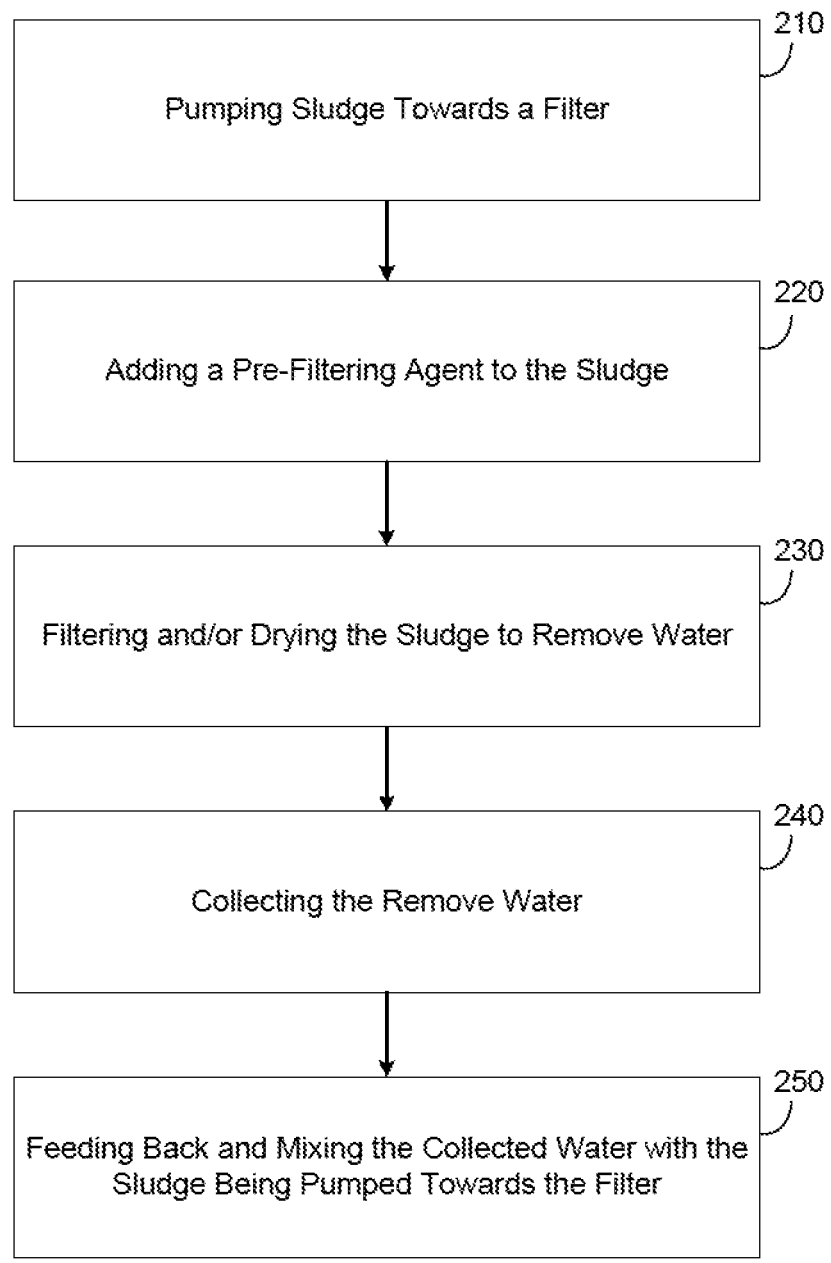

FEEDBACK LOOP FOR SLUDGE FILTERING

CROSS-REFERENCE TO RELATED APPLICATION

This application claims the benefit of U.S. Provisional Patent Application No. 62/742,982, filed on Oct. 9, 2018, in the United States Patent and Trademark Office, the entire disclosure of which is incorporated herein for all purposes.

BACKGROUND

Managing manure phosphorus and other damaging elements such as nitrogen has become a priority concern of livestock operations, in part due to nutrient management implications with the land application of manure. Concentrated livestock production can cause unwanted regional and farm-scale accumulations of phosphorus and nitrogen in certain areas due to the nature of feed nutrients and metabolism by the animal. The average cow can consume more than 100 pounds of feed per day, with manure typically containing more than two-thirds of the consumed feed. Thus, phosphorus, nitrogen and other compounds in the cattle feed are effectively transmitted to the soil following digestion. These accumulations can contaminate and eventually permeate runoff water and contribute to downstream eutrophication, one of the most pervasive water quality problem in the United States.

The legacy effect of regional and farm-based accumulations of phosphorus had been compounded by the imperfect ratio of nitrogen and phosphorus in most livestock manures, which contaminates soil when the manure is used as a fertilizer source. When the ratio of phosphorus in manure is too high relative to nitrogen, the result is an excess of phosphorus agricultural soils since manures are applied to meet crop nitrogen demand. Few options are available to efficiently move manure phosphorus from areas of surplus to areas of deficit and few options exist to adjust manure nutrient ratios to better fit crop demand.

To prevent too much phosphorus from being deposited in one area, often a farm or other manure processor may unload the manure to other willing participants who need the manure for fertilizer. However, this requires the farmer/processor to load the manure onto trucks and transport the manure to distributed locations which may be costly and/or logistically challenging. Accordingly, what is needed is a better way for removing phosphorus and other nutrients from manure.

SUMMARY

The examples described herein provide a filtration system that may include one or more of a filter configured to remove minerals from sludge, a pump configured to move the sludge towards the filter, a pre-filtering system configured to add an agent into the sludge prior to the sludge making contact with the filter, a drainage collection system configured to collect water drained during and/or after the filtering and feedback the drained water to the pump, and a valve configured to mix the drained water with the sludge to generate a mixture which is moved by the pump towards the filter.

The example embodiments described herein further provide a filtration process that may include one or more of pumping sludge towards a filter, adding a pre-filtering agent to the sludge while the sludge is moving towards the filter and prior to making contact with the filter, filtering and/or dewatering the sludge to remove water from the sludge to generate dewatered sludge, collecting the water removed from the sludge within a collection system, and feeding back the collected water and mixing the fed back water with the sludge being pumped towards the filter.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2 is a diagram illustrating a sludge filtration and dewatering process with a water feedback in accordance with an example embodiment.

Figure 1:
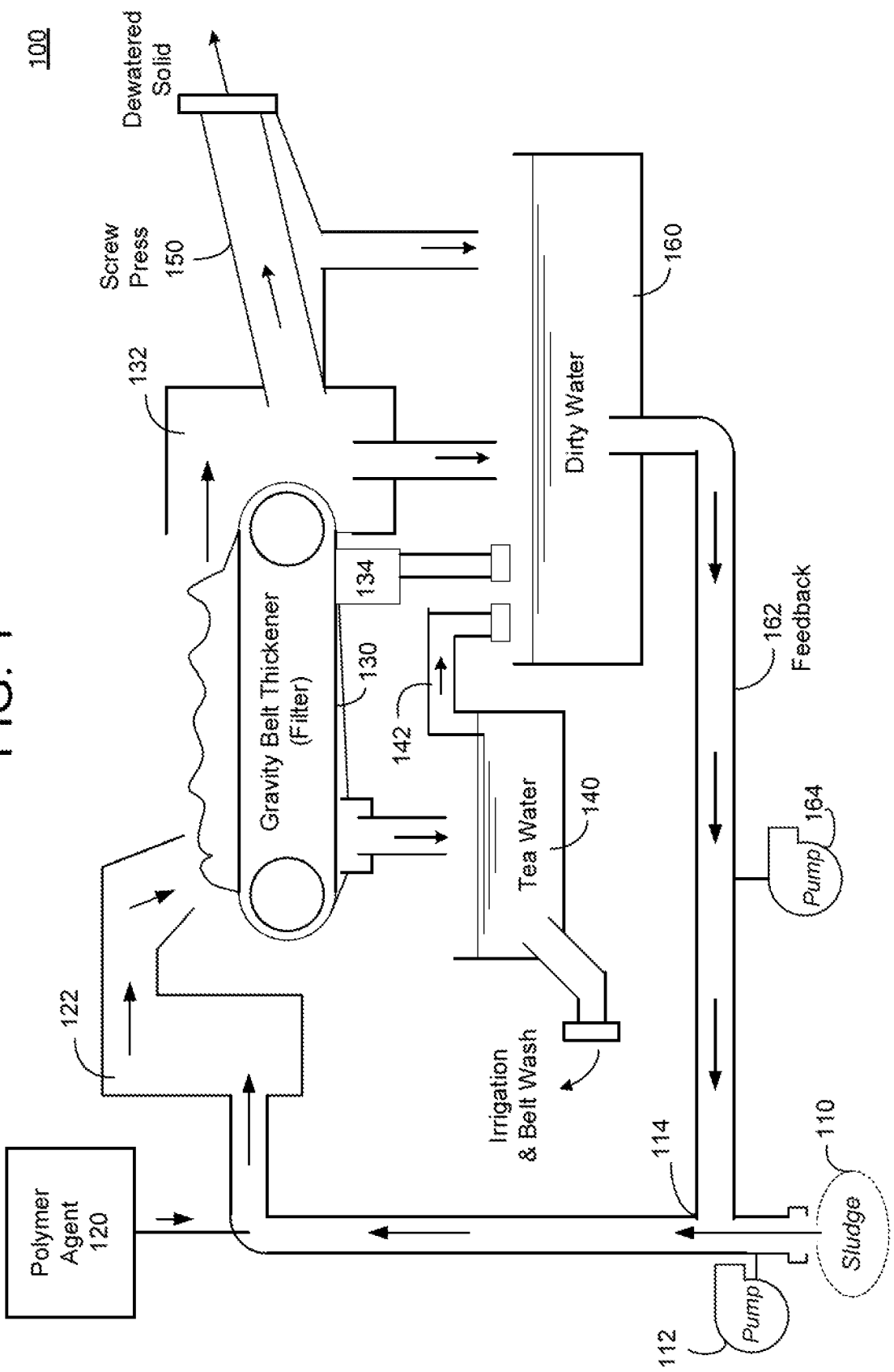
FIG. 1 is a diagram illustrating a sludge filtration and dewatering system with a water feedback loop in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown, but is to be accorded the widest scope consistent with the principles and features herein.

Livestock are typically held in pens or other areas. Cows, for example, often generate a significant amount of manure on a daily basis. In order to maintain the pens, water is used to wash the manure down a drain. The combination of the water and the manure collects in big ponds. The water and manure combination is then put into tanker trucks and spread out on land. The amount of manure that is allowed to be deposited on land is restricted by government regulation depending on how much regulated minerals (e.g., phosphorus, nitrogen, etc.) that it has. These regulations may limit how many pounds of, e.g., nitrogen and phosphorus are allowed to be deposited per acre of land. To address these regulations, farmers and other manure processors must look far and wide for other farms/places that will accept these manure deposits on their land. This process of hauling and depositing can create a significant expense and may present a logistical challenge.

The example embodiments overcome this problem by improving the ability of the farmer/manure processor to remove a larger amount of mineral (nitrogen, phosphorus, etc.) from manure-based sludge through the use of the filtration and dewatering process described herein. A typical filter can only remove a limited amount of phosphorus and nitrogen from sludge. As a result, the de-watered sludge must be spread out across multiple farms or other locations when distributed for use as fertilizer to adhere to regulations. However, the example embodiments incorporate a feedback loop within the filtration process that increases 1 the amount of phosphorus and nitrogen that is removed from the sludge. As a result, less distribution of the dewatered sludge is needed. In particular, water that is removed from the sludge while it is being drained through the filter and/or being dewatered via a pressurized device may be collected and fed back to an entry point of the sludge within the filtration system. As a result, the sludge has an increased amount of water which makes the minerals within the sludge easier to filter out.

By removing the minerals and liquifying the sludge, the farm is able to forego the use of tanker trucks to distribute manure solids and instead, spray the clarified water on the land which are dramatically reduce in nitrogen and phosphorus content. According to various embodiments, before the sludge reaches the filter, an agent may be used to treat the water/manure sludge mixture prior to entering the filter. The agent may be a polymer flocculant, etc. that helps in dewatering the sludge. The agent may be a chemical or powder that puts charged sites on the sludge, such that when the agent is dissolved in water, it exposes many charged sites such that when the manure solid collides with the molecular structure of the flocculant, the solids agglomerate together.

Related art filtration systems do not use an additional water source when pumping the sludge/agent mixture onto a filter such as a gravity belt filter. One of the reasons for this is that prior art gravity belt filters cannot handle the additional hydraulic load. Therefore, the related filtration systems are limited in how much additional water can be added to the sludge before it is loaded to the filter. However, the Applicant has developed the ROTO-KONE® High Rate Drainage System, which significantly increases the amount of hydraulic loading that a gravity belt filter can handle, though other mechanisms are contemplated herein. As a result, the gravity belt can handle the additional water being fed back using the novel improvements described by the example embodiments.

As a result, the system disclosed herein permits the recirculation of a large amount of previously extracted water, which improves polymer utilization by reusing available polymer in the recirculated water as well as polymer mixing within the sludge. Recirculating water in this manner was not previously contemplated in the prior art due to limitation of prior art filtration systems that are heretofore addressed through Applicant's improved drainage system and Applicant's process expertise. As one example, the volume of water being fed back may be equal to (i.e., one to one ratio) the amount of sludge/water mixture being fed from the manure ponds, etc. However, embodiments are not limited to this ratio and may include any desirable ratio of water to sludge. Rather, the one-to-one ratio is used for convenience of description. In this example, by taking a stream of "dirty" reused water being fed back into the original sludge being pumped from a pond, etc., and assuming a flow of 200 gallons of sludge/minute, the system would take this water and pump feed it back at an equal rate of 200 gallons/minute. Thus, the initial sludge volume of 200 gallons/minute would become 400 gallons/minute with the additional recirculated dirty water. In particular, the additional dirty water being added to the incoming feed in essence cuts the viscosity of the sludge mixture and the solids coming into the filter by half, thereby allowing the polymer to mix with the filter substrate significantly more efficiently. As a result, a greater amount of mineral (phosphorus, nitrogen, etc.) is removed from the manure. In contrast, related prior art systems have a gravity belt that can only handle 200 gallons/minute at most. If this were to be used, this would overwhelm the system.

FIG. 1 illustrates a sludge filtration and drying system 100 with a water feedback loop in accordance with an example embodiment. Referring to FIG. 1, a sludge source 110 is pushed by a pump 112 towards a filter 130 via one or more pipes, tubes, vents, hoses, etc. The sludge source 110 may be cow manure or other animal manure or any other viscous substrate that may be collected from and fed into the system 100 via an inlet (not shown). The pump 112 may be a sludge pump, or the like, and may create motive force causing the sludge to move from the sludge source 110 to the filter 130. As the sludge is moved within the system 100, a polymer agent 120 may be added to the sludge prior to the sludge being moved to the filter 130. Here, the polymer agent may be a polymer flocculant which helps dewater the sludge. The sludge and the agent 120 may be combined to create a treated sludge 122. The treated sludge 122 is then fed to the filter 130 for an initial phase of dewatering.

The filter 130 may be a gravity belt thickener which includes a layer of filter on the belt. The gravity belt thickener may reduce sludge volume of biosolids and waste activated sludge and produce a pumpable concentrate for dewatering, transport, or further digestion. The gravity belt thickener may use only gravity and a porous drainage belt along with a drainage system to enhance thickening performance at a reduced operating cost. The gravity belt thickener may be designed for continuous operation, high hydraulic throughput, low polymer usage, low maintenance, and long operational life in the highly corrosive environment of waste treatment. The gravity belt thickener may employ gravity drainage through a filter belt to thicken polymer conditioned sludge prior to digestion, mechanical dewatering, or trucking to a land application site or disposal site.

Dilute sludge (typically 0.5% to 1.0%) is introduced at the feed end of a horizontal filter belt and is represented by reference numeral 122. As the slurry makes its way down the moving belt free water drains through the porous belt. The solids may be continuously turned, encouraging the drainage of more water. The gravity belt thickener may optionally include mechanisms to hold back the solids while causing constant movement throughout the entire sludge blanket allowing optimal drainage of free water. Sludge is discharged at the end of the horizontal filter belt as a pumpable thickened sludge 132. Here, the thickened sludge may include approximately 5.0% dewatered sludge.

Meanwhile, the thickened sludge 132 may be provided to a screw press 150 or other e.g., dewatering device that is capable of removing more water from the sludge. The gravity belt thickener 130 does not put much pressure on the sludge so it only releases free drainage water. However, the screw press 150 may provide physical pressure to the thickened sludge 132 to remove even more water (like wringing out a washcloth). The resulting material is dewatered solid (e.g., 15-20% dewatered sludge, etc.) that can be removed from the system 100.

In the example of FIG. 1, a collection system includes both a first reservoir 140 for collecting water that is removed during the filtering by filter 130, and a second reservoir 160 that collects water removed from the screw press 150 as well as other areas of the process. The initially removed water may be referred to as tea water and is collected by the reservoir 140. The tea water is the majority of the water and may be used for another purpose such as irrigation/fertilization. Meanwhile, the water that is removed by screw press 150 is the dirtier water which may be collected within the second reservoir 160. In some embodiments, the filter 130 may further include a belt going around the filter. Once the solids discharge, some solids stick to the belt. So the belt wash 134 is used to clean the manure off of the belt. The spent belt wash 134 water that is recovered following belt washing is dirtier than the tea water and is sent to the second reservoir 160 via pipes, tubing, etc.

In some embodiments, the dirty water from the second reservoir 160 may be fed back to the initial sludge entry point via a pipe 162 or other pipe, tubing, duct, etc. The dirty water 160 may include some polymer agent containing charged particles that have not yet attached with sludge solids and which can be beneficial for catching solids during a next time around. The feedback may be caused or helped by a pump 164 that helps pump the dirty water 160 through the pipe 162 towards an inlet 114. The recirculated water may be added to the sludge via the inlet 114. Here, the recirculated water may be incorporated into the initial source of sludge and pumped together by the pump 112 towards the filter 130 where it can be treated by the agent 120 before filtering. The result of the feedback of the water from reservoir 160 may create a larger feed of sludge that is being input to the filter 130 (with a higher water content) making the sludge less viscous and therefore making it easier for the flocculant to mix with sludge and react with the solids contained therein.

As a non-limiting example, the input sludge from the sludge source 110 may consist of 98% water and 2% solid. Meanwhile, the tea water that is initially filtered by the filter 130 and provide to the first reservoir 140 may be 100% water and 0% solids. The dirty water may obtained from, e.g., screw press 150 and belt wash 134 may be 99.9% water and 0.1% solids. Therefore, the dirty water being recirculated through valve 162 from the second reservoir can be almost entirely water e.g., 99.9%). As a result, by recirculated an equal amount of dirty water with the input sludge, the improved system can double the while only adding 0.1% more feed solids. The water that continues to be recirculated can be the same 200 gallons of water that is initially taken from the sludge during its initial run through the system 100.

In other words, the system may add an additional 200 gallons/minute (or some other desired volume) to the sludge source 110. Furthermore, in some cases, a runoff 142 may be used to move water from the first reservoir 140 to the second reservoir 160 to meet demand of the feedback or in response to an overflow in the first reservoir 140. The water within the system 100 is simply recirculating at a constant flow so that there is always an additional 200 gallons a minute. As a consequence, the farmer may generate a dewatered manure and tea water that has significantly less phosphorus, nitrogen, etc.

FIG. 2 illustrates a sludge filtration and dewatering process 200 with a water feedback in accordance with an example embodiment. For example, the process 200 may be performed by the system 100 shown in FIG. 1. Referring to FIG. 2, in 210, the process may include pumping sludge towards a filter. The sludge may include a significant amount of water to begin with (98% vs. 2.0%, etc.). The sludge may have been received from a manure pond on a farm, etc. The process may further include adding a pre-filtering agent to the sludge while the sludge is moving towards the filter and prior to making contact with the filter. For example, the pre-filtering agent may be a polymer flocculant that is beneficial for dewatering the sludge.

In 230, the process may include filtering and/or dewatering the sludge to remove suspended solids from the feed to generate tea water. The filtering may be performed by a gravity belt thickener or other filter capable of capturing minerals/solids from the sludge being provided. The dewatering may be performed by a pressurized device such as a screw press or the like which is capable of removing additional water that still remains within the thickened sludge mixture after it has passed through the gravity belt thickener.

In 240, the process may include collecting the water removed from the sludge within a collection system. As one example, the collection system may include a plurality of reservoirs that hold water from different stages of the filtration and dewatering process such that some reservoirs hold cleaner water than others. In some cases, the reservoirs may have runoff valves or other pipes that allow for water to be transferred between the different reservoirs in case of an overflow or to handle a feedback need. In 250, the process may include feeding back the collected water and mixing the recirculated water with the sludge being pumped towards the filter. The additional water creates a lower viscosity within the sludge mixture enabling improved polymer mixing and more minerals or compounds of interest (nitrogen, phosphorus, etc.) to be captured by the gravity belt thickener.

Another benefit of the feedback loop is that any unreacted polymer charge sites of the polymer (e.g., polymer agent 120 shown in FIG. 1) that did not get associated with solids and therefore joined within the tea water, may be brought back around a second time due (or more) to the feedback loop. The cumulative effect of this feature is a dramatic reduction in polymer dose (polymer agent 120) compared to a filtering process without a feedback loop.

The above descriptions and illustrations of processes herein should not be considered to imply a fixed order for performing the process steps. Rather, the process steps may be performed in any order that is practicable, including simultaneous performance of at least some steps. Although the disclosure has been described regarding specific examples, it should be understood that various changes, substitutions, and alterations apparent to those skilled in the art can be made to the disclosed embodiments without departing from the spirit and scope of the disclosure as set forth in the appended claims.

The invention claimed is:

1. A filtration system comprising:
   an entry point where sludge is entered into a channel of the filtration system;
   a gravity belt thickener configured to remove minerals and water from the sludge based on gravitational force;
   a pump configured to move the sludge in the channel towards the gravity belt thickener;
   a pre-filtering system configured to add an agent into the sludge prior to the sludge making contact with the gravity belt thickener;
   a screw press configured to receive the sludge after the gravity belt thickener and apply pressure to the sludge to further dewater the sludge;
   a drainage collection system comprising a first reservoir configured to collect tea water drained from the sludge during the filtering by the gravity belt thickener and a second reservoir configured to collect dirty water drained by the screw press after the gravity belt thickener, a runoff that transfers tea water from the first reservoir to the dirty water in the second reservoir, and a feedback channel comprising a second pump configured to feedback the tea water and the dirty water in the second reservoir to a location within the channel where new sludge is being pumped to the gravity belt thickener thereby lowering a viscosity of the new sludge prior to the new sludge reaching the gravity belt thickener; and a valve configured to mix the tea water and the dirty water with the sludge to generate a mixture which is moved by the pump towards the gravity belt thickener.

2. The filtration system of claim 1, wherein the first reservoir is configured to pump overflow to the second reservoir via the runoff.

3. The filtration system of claim 1, wherein the first reservoir is configured to pump the water drained by the filter to an irrigation system.

4. The filtration system of claim 1, wherein the pre-filtering system is configured to add a polymer-flocculant agent to the sludge.

5. The filtration system of claim 1, further comprising a control system that is electrically connected to the pre-filtering system and the gravity belt thickener.

6. A filtration process comprising:

entering sludge into a channel of a filtration system at an entry point;

pumping the sludge in the channel towards a gravity belt thickener;

adding a pre-filtering agent to the sludge while the sludge is moving towards the gravity belt thickener and prior to making contact with the gravity belt thickener;

filtering the sludge to remove minerals and tea water from the sludge via the gravity belt thickener;

receiving the filtered sludge from the gravity belt thickener and dewatering the sludge based on pressure from a screw press to remove dirty water from the sludge to generate dewatered sludge;

collecting the tea water removed from the sludge by the gravity belt thickener via a first reservoir disposed under the gravity belt thickener;

collecting the dirty water removed from the sludge by the screw press with a second reservoir that is separate from the first reservoir and that is disposed under the screw press;

transferring tea water from the first reservoir to the dirty water in the second reservoir via a runoff between the first and second reservoirs; and feeding back the tea water and the dirty water from the second reservoir to a location within the channel where new sludge is being pumped to the gravity belt thickener thereby lowering a viscosity of the new sludge prior to the new sludge reaching the gravity belt thickener.

7. The filtration process of claim 6, wherein the method further comprises pumping overflow from the first reservoir to the second reservoir via the runoff.

8. The filtration process of claim 6, wherein the method further comprises pumping the collected tea water drained by the gravity belt thickener from the first reservoir to an irrigation system.

9. The filtration process of claim 6, wherein the adding comprises adding a polymer-flocculant agent to the sludge.

* * * * *